Oct. 14, 1924.                               1,511,727
A. HORWITZ
RESILIENT SUSPENSION APPARATUS
Filed Sept. 28, 1923
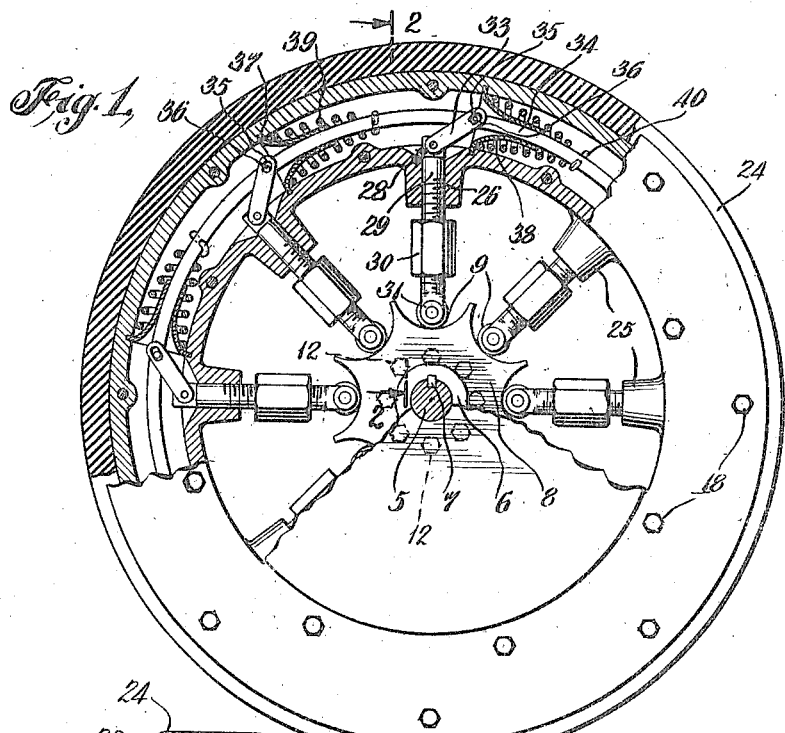
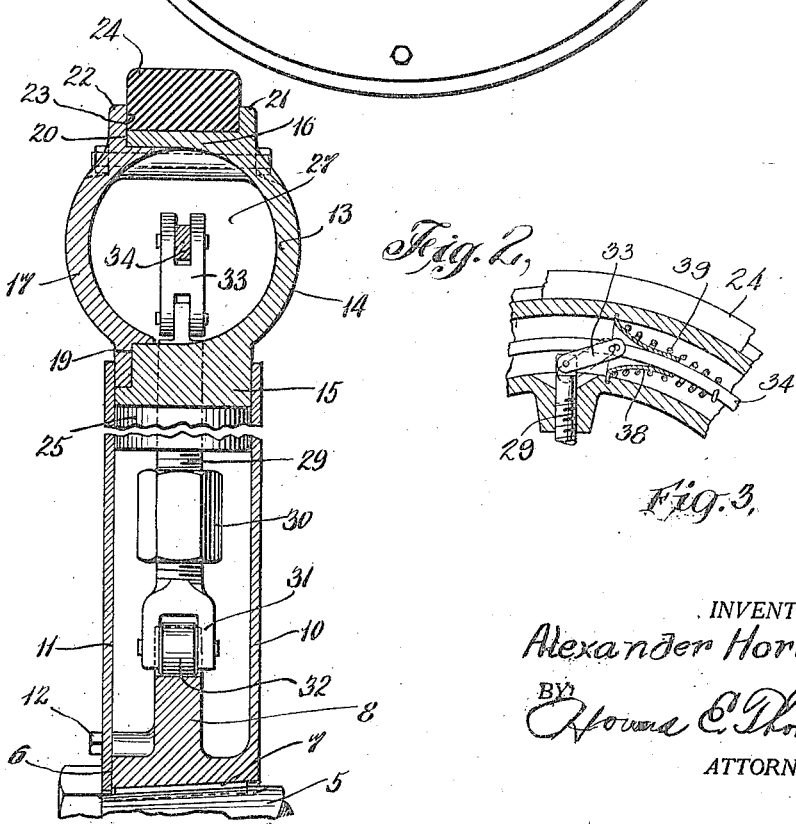
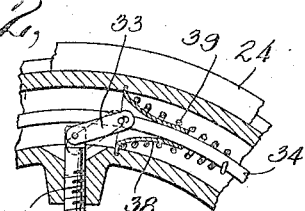
INVENTOR
Alexander Horwitz
BY
Thomas E. Thompson
ATTORNEY Patented Oct. 14, 1924.

1,511,727

UNITED STATES PATENT OFFICE.

ALEXANDER HORWITZ, OF NEW YORK, N. Y.

RESILIENT SUSPENSION APPARATUS.

Application filed September 28, 1923. Serial No. 665,288.

*To all whom it may concern:*

Be it known that I, ALEXANDER HORWITZ, a citizen of the United States, and residing at New York, in the county of New York and State of New York, have invented certain new and useful Improvements in Resilient Suspension Apparatus, of which the following is a specification, such as will enable those skilled in the art to which it appertains to make and use the same.

This invention relates to apparatus for suspending or supporting the bodies, mechanisms or devices of various kinds and classes to produce mechanically the effects of a pneumatic suspension or support, and the object of the invention is to provide an apparatus of the class specified composed of one or more resilient units with means for movably coupling said unit or units to a body, mechanism, or device of any kind or class in such manner that the weight, thrust or force of said body, mechanism or device will be sustained by and taken up by said resilient unit or units; a further object being to provide means for taking up the driving action of a predetermined element through resilient means; and with these and other objects in view the invention consists in an apparatus of the class and for the purpose specified which is simple in construction and operation and efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side view of an automobile drive wheel with parts of the construction broken away and in section;

Fig. 2 a partial section on the line 2—2 of Fig. 1 on an enlarged scale; and,

Fig. 3 is a detail view of parts of the construction shown in Fig. 1, and illustrating a different position thereof.

For the purpose of illustrating one use of my invention, I have shown in the accompanying drawing a vehicle wheel and in the drawing 5 represents a drive shaft of a motor vehicle, 6 a hub portion of my improved wheel which is mounted upon the shaft 5 and keyed thereto as shown at 7, said hub portion being provided substantially centrally thereof with an enlarged flange portion 8, the periphery of which is provided with a plurality of cam grooves or faces 9 equally spaced thereon and eight of which are employed in the construction shown. The hub 8 is also provided at one side thereof with an integral disk portion 10 which constitutes one side of the wheel and a detachable disk-shaped plate 11 is mounted on the other side of the wheel and is coupled with the hub portion 8 by screws 12.

In practice, I provide an annular tubular tread member 13, one part 14 of which constitutes an inner annular rim portion 15 and an outer rim portion 16 joined to the inner rim portion by a concavo-convex side plate, as clearly shown in Fig. 2 of the drawing, and a detachable side plate 17 is coupled with the opposite side of the rims 15 and 16 and secured thereto by spaced bolts 18, and the plate 17 is preferably grooved to receive the rims 15 and 16 as shown at 19 and 20. This construction constitutes a tread member which will represent and resemble the usual tire of a wheel, and the rim portion 16 is provided with an outwardly directed annular flange 21, and the plate 17 with a similar flange 22 forming an annular recess 23 to receive an annular tread facing 24 preferably composed of rubber or rubber and canvas of any kind or class.

The inner rim member 15 is provided with a plurality of inwardly and radially directed bearing members 25, eight of which are shown in the accompanying drawing, and these bearing members are provided with apertures 26 opening into the annular chamber 27 formed within the tread member 13, and the inner ends of the apertures 26 are preferably flared as shown at 28. Movably mounted in the apertures 26 are rods 29 having turn-buckles 30 thereon substantially centrally thereof, and the inner ends of the rods 29 are forked as shown at 31, and mounted in said forks are anti-friction rollers 32 which are adapted to operate in the cam grooves or faces 9 as clearly shown in Fig. 1 of the drawing.

Pivotally connected with the outer ends of the rods 29 are links 33, the free end portions of which are forked and span an annular ring 34 mounted centrally of the chamber 27, and pins 35 are mounted in connection with the ring 34 and passed through elongated apertures 36 in the free ends of the links 33.

The chamber within the tread member 13 is cylindrical in form in cross section, or substantially so, and at spaced intervals about the circumference of the tread member the walls of the chamber 27 are provided with circular or circumferential grooves 37 arranged radially to the axis of the wheel, and mounted in the chamber 27 are a plurality of conical bearing members 38, eight of which are employed, said members being fashioned to receive and support the ring 34 and to form bearings therefor. The members 38 are provided with annular flanges which enter the grooves 37 to key and retain the bearing members 38 in predetermined and fixed relation one with reference to the other, and against displacement in the tread member 13.

Mounted upon the ring 34 are a plurality of conical springs 39, the large ends of which are secured to the flanged ends of the conical bearings 38 or to the walls of the tread member 13 by soldering, welding or the like, and the smaller ends of said spring are secured to the ring 34 as shown at 40. The springs 39 preferably encircle or partially encircle the bearing members 38 while the links 33 are preferably pivotally connected with the ring 34 adjacent to the flared or enlarged ends of said bearing members.

In a motor vehicle wheel such as shown and described, my invention will be carried out as follows. The various parts of the apparatus will be assembled when the wheel is not in use, and after the parts have been assembled, it being understood that the spring members 39 of the required tension are employed, the turn-buckles 30 are adjusted to place the springs 39 under tension, this adjustment being very slight in that the total tension of all of the springs will be sufficient to sustain the load required. In a motor vehicle, let us say for example, that the springs are required to sustain one thousand pounds, the springs employed will then be sufficient when under the slightest tension to sustain the load specified. The wheel is now ready for use and under operating conditions or in traveling over a roadway which is smooth or which may be irregular, all jouncing or jarring which effects the wheels directly will be compensated for and taken up by the springs 39, the same acting to relieve the sudden shock or stress and yet operating to produce mechanically the effects of a pneumatic suspension, said spring taking the place of given pressure of air within a tire of given size.

In the action of the wheel it will be apparent that the axle 5 thereof becomes, at times, when the wheel is subjected to stresses or shock, or even under normal operating conditions, slightly eccentric to the tread member 13 and thus the hub portion 6 will correspondingly move, and by reason of the cam faces 9 on the flange 8 the rods 29 will be moved radially of the normal, and apparent floating axis, of the tread member 13. This radial movement of the rods 29 will actuate the links 33 to move the ring 34 circumferentially of the tread member 13 and within the bearings 38 to increase the tension of the springs 39 thus the springs compensate at all times for the wheel action and, as will be apparent, the load of the vehicle or that portion thereof to be supported by a wheel is resiliently supported.

With reference to the drive wheels of a vehicle, that is to say, the wheels which propel the vehicle along a roadway it will be understood that the driving of the wheel, especially in the initial operation thereof, will be transmitted through the springs 39. Let us assume that the vehicle is at a standstill with the wheels resting upon the roadway, the vehicle is now started, the shaft 5 being slowly or suddenly rotated through the usual transmission means, this operation will correspondingly rotate the hub portion 6, but by reason of friction the tread member 13 momentarily remains stationary as the hub portion 6 and flange 8 thereof proceeds to rotate all of the rods 29 are forced outwardly and radially by the action of the cam grooves or faces thereon, and this will continue until the springs 39 have been put under such tension that the tread member 13 will be substantially locked with the axle 5 through the hub portion and said rods. It will be understood that the springs 39 are of such construction as to compensate for the above described action, and that under the driving conditions the springs may momentarily develop a power by far greater than that required to actually overcome the ground friction of the wheel. The driving action above referred to is taken up by all of the springs through all of the rods, but in taking up the wheel shocks only a few of the rods will act upon the ring 34, but this action is taken up by all of the springs as any circumferential movement of the ring will correspondingly act upon all of the springs.

It will be understood that suitable means will be provided for giving the required strength and durability to the tread member 13 to prevent any lateral movement thereof with reference to the hub 6, the flange 10 and plate 11 operating to accomplish this result in the construction shown and, if desired, these plates properly constructed may be sufficient to accomplish the desired result but, if necessary, other means may be employed for accomplishing this result without departing from the scope of my invention.

It will be understood that while I have shown and described one use of my invention that the principle of my invention may be applied to other devices or apparatus of any kind or class, the basic principle of my invention being the provision of a mechanical apparatus designed to produce the results of and having the properties of a pneumatic element of any kind or class, and in the construction shown my apparatus is designed to take the place of and produce the results of a pneumatic tire, the rubber tread 24 being employed solely for the purpose of preventing noise in the operation of the wheel over a roadway which would be the case if a metallic facing were employed, while I have shown and described the specific form of apparatus for carrying my invention into effect, it will be understood that I am not necessarily limited to the several parts of the construction herein shown and described, nor their arrangement and method of operation, and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A resilient suspension apparatus of the class described comprising a plurality of suitably supported resilient elements, means secured and movable relatively to said resilient elements for placing said elements under tension, and means for actuating said first named means.

2. A resilient suspension apparatus of the class described comprising a plurality of suitably supported resilient elements, means supported within and passing through said resilient elements and to which said elements are secured for placing said elements under tension, and means for actuating said first named means.

3. A resilient suspension apparatus of the class described comprising a plurality of suitably supported resilient elements, means supported within and passing through said resilient elements and to which said elements are secured for placing said elements under tension, and means for actuating said first named means, said last named means involving members movable at an angle to said first named means.

4. A resilient suspension apparatus of the class described comprising a plurality of resilient elements, a member movable relatively to said elements and to which the same are secured, devices movably coupled with said member and movable relatively thereto for actuating the same to place said resilient elements under tension, and means adapted to be coupled with a member to be suspended by said apparatus for actuating said devices.

5. A resilient wheel of the class described comprising a hub portion, a tread member, a plurality of elements movably mounted in connection with said tread member and extending radially thereof and in relative connection with said hub, a plurality of resilient devices mounted in and spaced circumferentially of said tread member, one end of each of said resilient devices being fixed at predetermined points to said tread member, and means coupled with said elements and with the other ends of said resilient members for placing the same under tension.

6. A resilient wheel of the class described comprising a hub portion, a tread member, a plurality of elements movably mounted in connection with said tread member and extending radially thereof and in relative connection with said hub, a plurality of resilient devices mounted in and spaced circumferentially of said tread member, one end of each of said resilient devices being fixed at predetermined points to said tread member, means coupled with said elements and with the other ends of said resilient members for placing the same under tension, and means for adjusting the tension of said devices.

7. A resilient wheel of the class described comprising a hub portion, a tread member, a plurality of elements movably mounted in connection with said tread member and extending radially thereof and in relative connection with said hub, a plurality of resilient devices mounted in and spaced circumferentially of said tread member, one end of each of said resilient devices being fixed at predetermined points to said tread member, means coupled with said elements and with the other ends of said resilient members for placing the same under tension, means for adjusting the tension of said devices, and means on said hub for moving said elements radially of said tread member against the tension of said resilient devices.

8. A resilient wheel of the class described comprising a hub portion, a tread member, a plurality of elements movably mounted in connection with said tread member and extending radially thereof and in relative connection with said hub, a plurality of resilient devices mounted in and spaced circumferentially of said tread member, one end of each of said resilient devices being fixed at predetermined points to said tread member, means coupled with said elements and with the other ends of said resilient members for placing the same under tension, means for adjusting the tension of said devices, means on said hub for moving said elements radially of said tread member against the tension of said resilient devices in the movement of said hub eccentrically to the axis of the tread member.

9. A resilient wheel of the class described comprising a hub portion, a tread member, a plurality of elements movably mounted in connection with said tread member and extending radially thereof and in relative connection with said hub, a plurality of resilient devices mounted in and spaced circumferentially of said tread member, one end of each of said resilient devices being fixed at predetermined points to said tread member, means coupled with said elements and with the other ends of said resilient members for placing the same under tension, means for adjusting the tension of said devices, means on said hub for moving said elements radially of said tread member against the tension of said resilient devices in the movement of said hub eccentrically to the axis of the tread member, and in the rotary movement of said hub.

10. In a resilient suspension apparatus of the class described, a suitably supported resilient element, means secured to and movable relatively to said element for coupling the same with a member to be suspended, said means involving a ring member.

In testimony that I claim the foregoing as my invention I have signed my name this 26th day of Sept., 1923.

ALEXANDER HORWITZ.